(12) United States Patent
Shibayama et al.

(10) Patent No.: US 6,621,511 B2
(45) Date of Patent: Sep. 16, 2003

(54) OPTICAL RECORDING APPARATUS INCLUDING LIGHT-TRANSMITTING DIFFRACTION GRATING AND MULTI-CHANNEL ACOUSTO-OPTIC MODULATOR

(75) Inventors: Yasuyuki Shibayama, Ibaraki (JP); Keiji Kataoka, Ibaraki (JP)

(73) Assignee: Hitachi Printing Solutions, Ltd., Ebina (JP)

(*) Notice: Subject to any disclaimer, the term of this patent is extended or adjusted under 35 U.S.C. 154(b) by 0 days.

(21) Appl. No.: 10/005,162

(22) Filed: Dec. 7, 2001

(65) Prior Publication Data

US 2002/0071025 A1 Jun. 13, 2002

(30) Foreign Application Priority Data

Dec. 8, 2000 (JP) .................................. P. 2000-374405

(51) Int. Cl.$^7$ .............................. B41J 2/47; B41J 15/14
(52) U.S. Cl. ...................................... 347/239; 347/241
(58) Field of Search ............................ 347/239, 241, 347/255, 256; 359/204, 209, 285, 305, 563, 566, 569

(56) References Cited

U.S. PATENT DOCUMENTS

| | | | | |
|---|---|---|---|---|
| 5,574,597 A | * | 11/1996 | Kataoka | 359/569 |
| 5,631,762 A | * | 5/1997 | Kataoka | 359/204 |
| 6,178,028 B1 | * | 1/2001 | Washiyama et al. | 359/204 |
| 6,417,953 B1 | * | 7/2002 | Iizuka | 359/305 |
| 6,466,351 B1 | * | 10/2002 | Iizuka et al. | 359/209 |

* cited by examiner

Primary Examiner—Hai Pham
(74) Attorney, Agent, or Firm—McGinn & Gibb, PLLC

(57) ABSTRACT

An optical recording apparatus includes a light-transmitting diffraction grating at a front focus of an imaging lens and a multi-channel acousto-optic modulator provided at a back focus of the lens. An angle formed between a plane formed by diffracted beams emerging from the lens and a revolution surface of a rotating polygonal mirror is set to be equal to an angle at which the beam diffracted by the multi-channel acousto-optic modulator emerges to be incident on the mirror. The diffracted beams are incident on the imaging lens to satisfy a predetermined condition.

2 Claims, 13 Drawing Sheets

PRIOR ART

FIG.17 f=60mm

| | | | | | | |
|---|---|---|---|---|---|---|
| INCIDENT ANGLE α [rad.] | 0.0000 | 0.0087 | 0.0175 | 0.0349 | 0.0873 | 0.1745 |
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 1ST-ORDER LIGHT | 1.499 | 1.499 | 1.499 | 1.498 | 1.495 | 1.483 |
| y'COORDINATE [mm] FOR 1ST-ORDER LIGHT | 0.000 | 0.003 | 0.006 | 0.012 | 0.030 | 0.058 |
| AMOUNT OF CURVATURE u [μm] | 0.000 | 0.110 | 0.210 | 0.430 | 1.080 | 2.190 |
| u*f | 0 | 0.007 | 0.013 | 0.026 | 0.065 | 0.131 |
| (u*f)/m^2 | 0.000 | 0.007 | 0.013 | 0.026 | 0.065 | 0.131 | f=330mm

| | | | | | | |
|---|---|---|---|---|---|---|
| INCIDENT ANGLE α [rad.] | 0.0000 | 0.0087 | 0.0175 | 0.0349 | 0.0873 | 0.1745 |
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 1ST-ORDER LIGHT | 1.500 | 1.500 | 1.500 | 1.499 | 1.496 | 1.485 |
| y'COORDINATE [mm] FOR 1ST-ORDER LIGHT | 0.000 | 0.003 | 0.006 | 0.012 | 0.029 | 0.056 |
| AMOUNT OF CURVATURE u [μm] | 0.000 | 0.020 | 0.040 | 0.080 | 1.190 | 0.410 |
| u*f | 0 | 0.007 | 0.013 | 0.026 | 0.063 | 0.135 |
| (u*f)/m^2 | 0.000 | 0.007 | 0.013 | 0.026 | 0.063 | 0.135 | f=600mm

| | | | | | | |
|---|---|---|---|---|---|---|
| INCIDENT ANGLE α [rad.] | 0.0000 | 0.0087 | 0.0175 | 0.0349 | 0.0873 | 0.1745 |
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 1ST-ORDER LIGHT | 1.500 | 1.500 | 1.500 | 1.499 | 1.496 | 1.486 |
| y'COORDINATE [mm] FOR 1ST-ORDER LIGHT | 0.000 | 0.003 | 0.006 | 0.012 | 0.029 | 0.056 |
| AMOUNT OF CURVATURE u [μm] | 0.000 | 0.010 | 0.020 | 0.050 | 0.110 | 0.220 |
| u*f | 0 | 0.006 | 0.012 | 0.03 | 0.066 | 0.132 |
| (u*f)/m^2 | 0.000 | 0.006 | 0.012 | 0.030 | 0.066 | 0.132 |

FIG.18 f=60mm

| | | | | | | | |
|---|---|---|---|---|---|---|---|
| INCIDENT ANGLE α [rad.] | 0.0000 | 0.0087 | 0.0175 | 0.0349 | 0.0873 | 0.1745 |
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 2ND-ORDER LIGHT | 2.992 | 2.992 | 2.992 | 2.991 | 2.985 | 2.961 |
| y'COORDINATE [mm] FOR 2ND-ORDER LIGHT | 0.000 | 0.003 | 0.007 | 0.013 | 0.033 | 0.065 |
| AMOUNT OF CURVATURE u [μm] | 0.000 | 0.430 | 0.850 | 1.710 | 4.310 | 8.790 |
| u*f | 0 | 0.258 | 0.051 | 0.1026 | 0.2586 | 0.5274 |
| (u*f)/m^2 | 0.000 | 0.006 | 0.013 | 0.026 | 0.065 | 0.132 | f=330mm

| | | | | | | | |
|---|---|---|---|---|---|---|---|
| INCIDENT ANGLE α [rad.] | 0.0000 | 0.0087 | 0.0175 | 0.0349 | 0.0873 | 0.1745 |
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 2ND-ORDER LIGHT | 3.000 | 3.000 | 2.999 | 2.999 | 2.992 | 2.969 |
| y'COORDINATE [mm] FOR 2ND-ORDER LIGHT | 0.000 | 0.003 | 0.006 | 0.012 | 0.030 | 0.057 |
| AMOUNT OF CURVATURE u [μm] | 0.000 | 0.080 | 0.160 | 0.310 | 0.790 | 1.630 |
| u*f | 0 | 0.026 | 0.053 | 0.102 | 0.261 | 0.538 |
| (u*f)/m^2 | 0.000 | 0.007 | 0.013 | 0.026 | 0.065 | 0.134 | f=600mm

| | | | | | | | |
|---|---|---|---|---|---|---|---|
| INCIDENT ANGLE α [rad.] | 0.0000 | 0.0087 | 0.0175 | 0.0349 | 0.0873 | 0.1745 |
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 2ND-ORDER LIGHT | 3.000 | 3.000 | 3.000 | 2.999 | 2.992 | 2.969 |
| y'COORDINATE [mm] FOR 2ND-ORDER LIGHT | 0.000 | 0.003 | 0.006 | 0.012 | 0.029 | 0.056 |
| AMOUNT OF CURVATURE u [μm] | 0.000 | 0.040 | 0.090 | 0.180 | 0.440 | 0.900 |
| u*f | 0 | 0.024 | 0.054 | 0.108 | 0.264 | 0.540 |
| (u*f)/m^2 | 0.000 | 0.006 | 0.014 | 0.027 | 0.066 | 0.135 |

FIG. 19 f=60mm

| INCIDENT ANGLE α [rad.] | 0.0000 | 0.0087 | 0.0175 | 0.0349 | 0.0873 | 0.1745 |
|---|---|---|---|---|---|---|
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 3RD-ORDER LIGHT | 4.474 | 4.474 | 4.474 | 4.472 | 4.463 | 4.427 |
| y'COORDINATE [mm] FOR 3RD-ORDER LIGHT | 0.000 | 0.004 | 0.008 | 0.016 | 0.039 | 0.076 |
| AMOUNT OF CURVATURE u [μm] | 0.000 | 0.970 | 1.930 | 3.860 | 9.720 | 19.860 |
| u*f | 0 | 0.0582 | 0.1158 | 0.2316 | 0.5832 | 1.1916 |
| (u*f)/m^2 | 0.000 | 0.006 | 0.013 | 0.026 | 0.065 | 0.132 | f=330mm

| INCIDENT ANGLE α [rad.] | 0.0000 | 0.0087 | 0.0175 | 0.0349 | 0.0873 | 0.1745 |
|---|---|---|---|---|---|---|
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 3RD-ORDER LIGHT | 4.499 | 4.499 | 4.499 | 4.497 | 4.488 | 4.453 |
| y'COORDINATE [mm] FOR 3RD-ORDER LIGHT | 0.000 | 0.003 | 0.006 | 0.012 | 0.031 | 0.059 |
| AMOUNT OF CURVATURE u [μm] | 0.000 | 0.180 | 0.360 | 0.710 | 1.790 | 3.670 |
| u*f | 0 | 0.059 | 0.119 | 0.234 | 0.591 | 1.211 |
| (u*f)/m^2 | 0.000 | 0.007 | 0.013 | 0.026 | 0.066 | 0.135 | f=600mm

| INCIDENT ANGLE α [rad.] | 0.0000 | 0.0087 | 0.0175 | 0.0349 | 0.0878 | 0.1745 |
|---|---|---|---|---|---|---|
| INCIDENT ANGLE α [deg.] | 0 | 0.5 | 1 | 2 | 5 | 10 |
| x'COORDINATE [mm] FOR 0TH-ORDER LIGHT | 0.000 | 0.000 | 0.000 | 0.000 | 0.000 | 0.000 |
| y'COORDINATE [mm] FOR 0TH-ORDER LIGHT | 0.000 | 0.003 | 0.006 | 0.012 | 0.029 | 0.056 |
| x'COORDINATE [mm] FOR 3RD-ORDER LIGHT | 4.500 | 4.500 | 4.499 | 4.498 | 4.488 | 4.454 |
| y'COORDINATE [mm] FOR 3RD-ORDER LIGHT | 0.000 | 0.003 | 0.006 | 0.012 | 0.030 | 0.058 |
| AMOUNT OF CURVATURE u [μm] | 0.000 | 0.1 | 0.2 | 0.4 | 1.0 | 2.0 |
| u*f | 0 | 0.06 | 0.114 | 0.234 | 0.594 | 1.212 |
| (u*f)/m^2 | 0.000 | 0.007 | 0.013 | 0.026 | 0.066 | 0.135 |

FIG.20 f=60mm

| INCIDENT HEIGHT H [mm] | 0 | 0.5 | 1 | 1.5 | 2 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | 0.000 | -0.002 | -0.004 |
| x'COORDINATE [mm] FOR 1ST-ORDER LIGHT | 1.499 | 1.499 | 1.499 | 1.498 | 1.497 |
| y'COORDINATE [mm] FOR 1ST-ORDER LIGHT | 0.000 | 0.000 | -0.001 | -0.003 | -0.005 |
| AMOUNT OF CURVATURE v [μm] | 0.000 | -0.360 | -0.730 | -1.100 | -1.470 | u*f: 0
(u*f^2)/m^2: 0.000, -1.296, -2.628, -3.96, -5.292
                     -1.296, -2.628, -3.960, -5.292 f=330mm

| INCIDENT HEIGHT H [mm] | 0 | 1 | 2 | 5 | 10 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | 0.000 | -0.002 | -0.015 |
| x'COORDINATE [mm] FOR 1ST-ORDER LIGHT | 1.500 | 1.500 | 1.500 | 1.500 | 1.499 |
| y'COORDINATE [mm] FOR 1ST-ORDER LIGHT | 0.000 | 0.000 | 0.000 | -0.002 | -0.016 |
| AMOUNT OF CURVATURE v [μm] | 0.000 | -0.030 | -0.050 | -0.120 | -0.240 | u*f: 0
(u*f^2)/m^2: 0.000, -3.267, -5.445, -13.068, -26.136
                     -3.267, -5.445, -13.068, -26.136 f=600mm

| INCIDENT HEIGHT H [mm] | 0 | 2 | 5 | 10 | 20 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | -0.001 | -0.005 | -0.005 | -0.037 |
| x'COORDINATE [mm] FOR 1ST-ORDER LIGHT | 1.500 | 1.500 | 1.500 | 1.500 | 1.498 |
| y'COORDINATE [mm] FOR 1ST-ORDER LIGHT | 0.000 | -0.001 | -0.005 | -0.005 | -0.037 |
| AMOUNT OF CURVATURE v [μm] | 0.000 | -0.010 | -0.040 | -0.080 | -0.140 | u*f: 0
(u*f^2)/m^2: 0.000, -3.600, -14.400, -28.800, -50.400
                     -3.600, -14.400, -28.800, -50.400

FIG.21 f=60mm

| INCIDENT HEIGHT H [mm] | 0 | 0.5 | 1 | 1.5 | 2 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | 0.000 | 0.000 | -0.004 |
| x'COORDINATE [mm] FOR 2ND-ORDER LIGHT | 2.992 | 2.992 | 2.992 | 2.991 | 2.989 |
| y'COORDINATE [mm] FOR 2ND-ORDER LIGHT | 0.000 | -0.002 | -0.003 | -0.006 | -0.010 |
| AMOUNT OF CURVATURE v [μm] | 0.000 | -1.470 | -2.940 | -4.420 | -5.910 |

| u*f | 0 | -5.292 | -10.584 | -15.912 | -21.276 |
|---|---|---|---|---|---|
| (u*f^2)/m^2 | 0.000 | -1.323 | -2.646 | -3.978 | -5.319 | f=330mm

| INCIDENT HEIGHT H [mm] | 0 | 1 | 2 | 5 | 10 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | 0.000 | -0.002 | -0.015 |
| x'COORDINATE [mm] FOR 2ND-ORDER LIGHT | 3.000 | 3.000 | 3.000 | 2.999 | 2.997 |
| y'COORDINATE [mm] FOR 2ND-ORDER LIGHT | 0.000 | 0.000 | 0.000 | -0.002 | -0.016 |
| AMOUNT OF CURVATURE v [μm] | 0.000 | -0.100 | -0.190 | -0.490 | -0.970 |

| u*f | 0 | -10.890 | -20.691 | -53.361 | -105.633 |
|---|---|---|---|---|---|
| (u*f^2)/m^2 | 0.000 | -2.723 | -5.173 | -13.340 | -26.408 | f=600mm

| INCIDENT HEIGHT H [mm] | 0 | 2 | 5 | 10 | 20 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | -0.001 | -0.005 | -0.037 |
| x'COORDINATE [mm] FOR 2ND-ORDER LIGHT | 3.000 | 3.000 | 3.000 | 2.999 | 2.997 |
| y'COORDINATE [mm] FOR 2ND-ORDER LIGHT | 0.000 | 0.000 | -0.001 | -0.005 | -0.038 |
| AMOUNT OF CURVATURE v [μm] | 0.000 | -0.060 | -0.150 | -0.300 | -0.580 |

| u*f | 0 | -21.6 | -54 | -108 | -208.8 |
|---|---|---|---|---|---|
| (u*f^2)/m^2 | 0.000 | -5.400 | -13.500 | -27.000 | -52.200 |

FIG.22 f=60mm

| INCIDENT HEIGHT H [mm] | 0 | 0.5 | 1 | 1.5 | 2 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | 0.000 | -0.002 | -0.004 |
| x'COORDINATE [mm] FOR 3RD-ORDER LIGHT | 4.474 | 4.474 | 4.473 | 4.471 | 4.469 |
| y'COORDINATE [mm] FOR 3RD-ORDER LIGHT | 0.000 | -0.003 | -0.007 | -0.012 | -0.017 |
| AMOUNT OF CURVATURE v [μm] | 0.000 | -3.330 | -6.670 | -10.030 | -13.410 |
| u*f | 0 | -11.988 | -24.012 | -36.108 | -48.276 |
| (u*f^2)/m^2 | 0.000 | -1.332 | -2.668 | -4.012 | -5.364 | f=330mm

| INCIDENT HEIGHT H [mm] | 0 | 1 | 2 | 5 | 10 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | 0.000 | -0.002 | -0.015 |
| x'COORDINATE [mm] FOR 3RD-ORDER LIGHT | 4.499 | 4.499 | 4.499 | 4.498 | 4.495 |
| y'COORDINATE [mm] FOR 3RD-ORDER LIGHT | 0.000 | 0.000 | -0.001 | -0.003 | -0.017 |
| AMOUNT OF CURVATURE v [μm] | 0.000 | -0.220 | -0.430 | -1.090 | -2.180 |
| u*f | 0 | -23.958 | -46.827 | -118.701 | -237.402 |
| (u*f^2)/m^2 | 0.000 | -2.662 | -5.203 | -13.189 | -26.378 | f=600mm

| INCIDENT HEIGHT H [mm] | 0 | 2 | 5 | 10 | 20 |
|---|---|---|---|---|---|
| x'COORDINATE [mm] FOR 0TH-ORDER LIGHT | 0.000 | 0.000 | 0.000 | 0.000 | 0.000 |
| y'COORDINATE [mm] FOR 0TH-ORDER LIGHT | 0.000 | 0.000 | -0.001 | -0.005 | -0.037 |
| x'COORDINATE [mm] FOR 3RD-ORDER LIGHT | 4.500 | 4.500 | 4.499 | 4.498 | 4.495 |
| y'COORDINATE [mm] FOR 3RD-ORDER LIGHT | 0.000 | 0.000 | -0.001 | -0.005 | -0.038 |
| AMOUNT OF CURVATURE v [μm] | 0.000 | -0.130 | -0.330 | -0.660 | -1.320 |
| u*f | 0 | -46.8 | -118.8 | -237.6 | -475.2 |
| (u*f^2)/m^2 | 0.000 | -5.200 | -13.200 | -26.400 | -52.800 |

OPTICAL RECORDING APPARATUS INCLUDING LIGHT-TRANSMITTING DIFFRACTION GRATING AND MULTI-CHANNEL ACOUSTO-OPTIC MODULATOR

BACKGROUND OF THE INVENTION

1. Field of the Invention

The present invention relates to an optical recording apparatus, particularly to one such as a laser printer or a copier that perform optical recording by modulating and scanning a plurality of laser beams.

2. Description of the Related Art

Jp 10-197837A discloses one of the related art, which is described below with reference to FIG. 16. A multi-channel optical modulating apparatus in JP 10-197837A comprises a laser light source 2-1, a beam expander 2-3, a diffraction grating 2-9 by which the laser beam 2-2 issued from the laser light source 2-1 and passing through the beam expander 2-3 is split into five laser beamlets 2-4~2-8 spaced apart by an angle of θ, a condensing lens 2-10 for collimating and condensing the laser beams 2-4~2-8 issued from the diffraction grating 2-9, and a 5-channel acousto-optic modulator 2-16 for independently modulating the laser beams 2-11~2-15 emerging from the condensing lens 2-10.

The condensing lens 2-10 and the diffraction grating 2-9 are spaced by a distance equal to the focal length $f_{2-10}$ of the condensing lens 2-10, and so are the condensing lens 2-10 and the acousto-optic modulator 2-16.

However, as regards the disclosed multi-channel optical modulating apparatus, JP 10-197837A has no explicit statement of the conditions under which the diffracted beams 2-4~2-8 obtained by splitting with the diffraction grating 2-9 are incident on the condensing lens 2-10. In addition, no mention is made of the optics for the light exiting from the acousto-optic modulator. Therefore, depending on the case, the series of spots formed by allowing the laser beams 2-11~2-15 from the condensing lens 2-10 to be condensed on the acousto-optic modulator 2-16 may sometimes be curved. As a consequence, the ultrasonic waves used to perform optical modulation within the acousto-optic crystal in the acousto-optic modulator 2-16 will have time delays before they reach the individual spots of condensed light; what is more, when a plurality of beams are scanned over a photosensitive material placed subsequent to the acousto-optic modulator 2-16, an error will be introduced in the distance between adjacent scanning lines.

SUMMARY OF THE INVENTION

Therefore, an object of the present invention is to ensure that no curvature will be introduced in the series of spots formed by allowing the individual laser beams from the condensing lens to be condensed on the acousto-optic modulator. Another object of the invention is to provide an optical recording apparatus with which the spots of condensed light on the acousto-optic modulator can be imaged on a surface of interest to perform scanning with a plurality of beams without introducing an error in the distance between adjacent scanning lines.

The objects of the invention can be attained by an optical recording apparatus comprising a light source which issues laser light, a light-transmitting diffraction grating by means of which the laser light issued from said light source is split into a plurality of diffracted light beams, a multi-channel acousto-optic modulator which modulates said plurality of diffracted light beams being sent from said light-transmitting diffraction grating, an imaging lens provided on the optical path between said light-transmitting diffraction grating and said multi-channel acousto-optic modulator, and a rotating polygonal mirror by means of which the plurality of laser beams being sent from said multi-channel acousto-optic modulator are scanned in a given direction with respect to the surface being scanned, said light-transmitting diffraction grating being provided at the front focus of said imaging lens and said multi-channel acousto-optic modulator being provided at the back focus of said imaging lens, characterized in that said multi-channel acousto-optic modulator is provided on said optical path in such a way that the individual channels thereof are arranged substantially horizontally.

BRIEF DESCRIPTION OF THE DRAWINGS

FIG. 17 illustrates the coordinates of the positions for image formation by the zeroth-order diffracted light as compared to those for the first-order diffracted light.

FIG. 18 illustrates the coordinates of the positions for image formation by the zeroth-order diffracted light as compared to those for the second-order diffracted light.

FIG. 19 illustrates the coordinates of the positions for image formation by the zeroth-order diffracted light as compared to those for the third-order diffracted light.

FIG. 20 illustrates the coordinates of the positions for image formation by the zeroth-order diffracted light as compared to those for the first-order diffracted light.

FIG. 21 illustrates the coordinates of the positions for image formation by the zeroth-order diffracted light as compared to those for the second-order diffracted light.

FIG. 22 illustrates the coordinates of the positions for image formation by the zeroth-order diffracted light as compared to those for the third-order diffracted light.

DETAILED DESCRIPTION OF THE PRESENT INVENTION

The present invention will be described below with reference to accompanying drawings.

Figure 2:
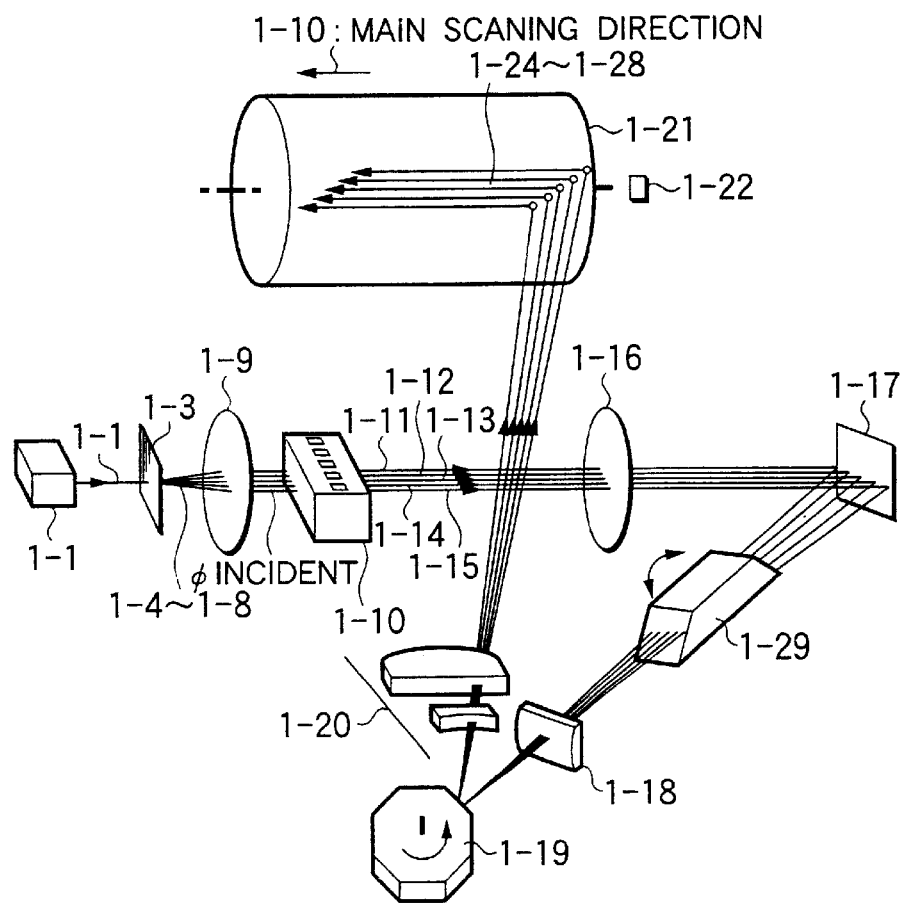
FIG. 2 is a schematic overall view of the optical recording apparatus of the invention.

FIG. 2 is a schematic overall view of an optical recording apparatus according to an embodiment of the invention. FIG. 2 also shows the principal rays of beams propagating through optics. Laser light 1-2 issuing from a light source 1-1 is first launched onto a light-transmitting diffraction grating 1-3. The light-transmitting diffraction grating 1-3 is made on a flat glass which is formed of quartz glass or other optical glass member. The incident beam 1-2 is split into a plurality of diffracted beamlets by means of the transmitting diffraction grating 1-3 and the respective beamlets pass through an imaging lens 1-9 to be focused on a multi-channel acousto-optic modulator 1-10.

In FIG. 2, five diffracted beamlets (1-4~1-8) are shown and the highest diffraction order used is +2 or −2. As will be described later in detail, the relative positions of the light-transmitting diffraction grating 1-3, the imaging lens 1-9 and the multi-channel acousto-optic modulator 10 are such that the light-transmitting diffraction grating 1-3 is positioned at the front focus of the imaging lens 1-9 and the multi-channel acousto-optic modulator 1-10 at its back focus.

The channels of the multi-channel acousto-optic 1-10 are arranged in a plane parallel to the surface of revolution of a rotating polygonal mirror 1-19 to be described later, or parallel to the main scanning surface of a multi-beam optical scanner, so that the series of image spots focused on the multi-channel acousto-optic modulator 1-10 are aligned in the main scanning surface.

Figure 1:
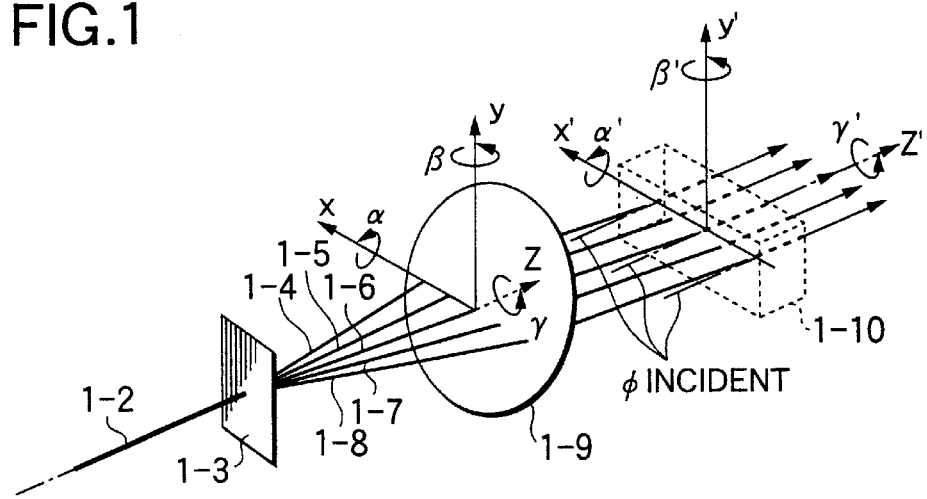
FIG. 1 is a partial enlarged view of the optics in the optical recording apparatus of the invention.

The multi-channel acousto-optic modulator 1-10 is such that in response to print information signals (not shown), ultrasonic signals are transmitted from a transducer on the acousto-optic crystal in the modulator 1-10 to perform optical modulation of the respective image spots focused in the modulator 1-10. In this case, as FIGS. 1 and 4 show, the angle formed between the plane formed by the plurality of diffracted beams emerging from the imaging lens 1-9 and the surface of revolution of the rotating polygonal mirror 1-19, namely, the main scanning surface of the multi-beam optical scanner (this angle is designated $\phi_{incident}$ in the figures) is so set that the beam modulated by the multi-channel acousto-optic modulator 10 emerges therefrom to be incident on the surface of revolution of the rotating polygonal mirror 1-19, namely, the main scanning surface.

The beams 1-11~1-15 emerging from the multi-channel acousto-optic modulator 1-10 are collimated by passage through a lens 1-16 and the resulting parallel beams pass through a dove prism 1-29 and a cylindrical lens 1-18 to illuminate the rotating polygonal mirror 1-19; the beams then pass through a scanning lens system 1-20 to be imaged on a photoreceptor drum 1-21 which is a light-sensitive member to be scanned. A plurality of image spots 1-24~1-28 formed on the photoreceptor drum 1-21 scan its surface at an angle so that the scanning lines formed of the respective image spots are close enough to one another. The angle is adjusted by rotating the dove prism 1-29 on the optical axis.

The cylindrical lens 1-18 is used to eliminate any offset that may be caused to the light scanning lines due to perturbations as the rotating polygonal mirror 1-19 rotates and to this end, the cylindrical lens 1-18 vertically adjusts the respective beamlets to be focused on the rotating polygonal mirror 1-18.

Figure 3:
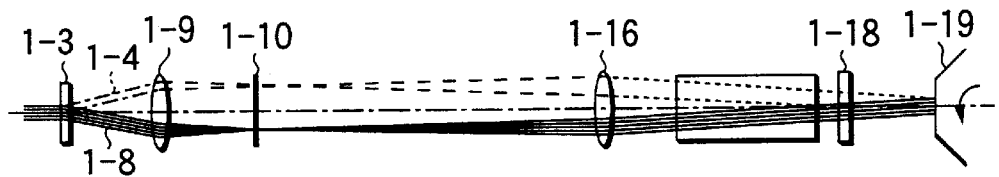
FIG. 3 shows the optics in the optical recording apparatus of the invention as seen in the main scanning direction.
Figure 4:
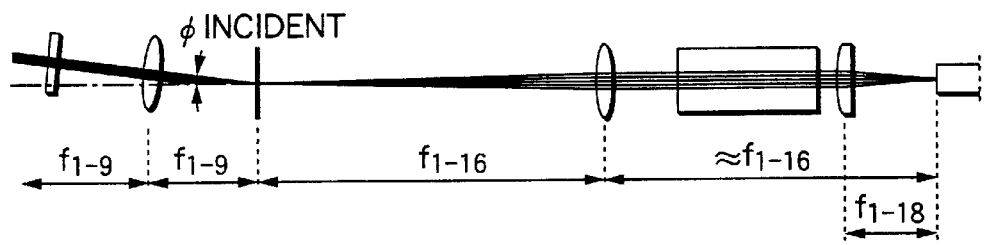
FIG. 4 shows the optics in the optical recording apparatus of the invention as seen in the auxiliary scanning direction.

FIGS. 3 and 4 show the relative positions of the components of the optical system shown in FIG. 2. FIG. 3 shows the optics in the optical recording apparatus as seen from the surface of revolution of the rotating polygonal mirror 1-19 which is a component of the optical recording apparatus, namely, the optics in the main scanning direction on the photoreceptor drum 1-21. FIG. 4 shows the same optics as seen in a perpendicular direction, namely, in the auxiliary scanning direction. To avoid any undue complexity, only two of the diffracted beams that are produced by splitting with the light-transmitting diffraction grating 1-3 are shown as outermost beams and the others are omitted.

Write the focal length of the imaging lens 1-9 as $f_{1-9}$ (mm), the focal length of the lens 1-16 as $f_{1-16}$ (mm), and the focal length of the cylindrical lens 1-18 as $f_{1-18}$ (mm); then, in FIGS. 3 and 4, the light-transmitting diffraction grating 1-3 and the imaging lens 1-9 are spaced by $f_{1-9}$ and so are the imaging lens 1-9 and the multi-channel acousto-optic modulator 1-10, whereas the multi-channel acousto-optic modulator 1-10 and the lens 1-16 are spaced by $f_{1-16}$. The imaging lens 1-9 and the lens 1-16 on opposite sides of the multi-channel acousto-optic modulator 1-10 combine to make a beam expander. The lens 1-16 and the rotating polygonal mirror 1-19 are spaced by a distance approximately equal to $f_{1-16}$. With this layout of the optics shown in FIG. 3 as seen in the main scanning direction, the principal rays of the laser beams that have been produced by splitting with the light-transmitting diffraction grating 1-3 in the direction parallel to the surface of revolution of the rotating polygonal mirror 1-19 emerge as collimated light from the lens 1-9 and pass through the multi-channel acousto-optic modulator 1-10 to illuminate the lens 1-16. The principal rays of the beams exiting from the lens 1-16 effectively meet together on the rotating polygonal mirror 1-19 to reduce the amount of beam vignetting by the rotating polygonal mirror 1-19.

Further referring to FIGS. 3 and 4, we now describe what will become of the individual laser beams 1-4~1-8 that have been produced by splitting with the light-transmitting diffraction grating 1-3. If the spot diameter of each of the beams focused on the multi-channel acousto-optic modulator 1-10 is written as δ (mm) and the distance between spots as d (mm), then the beam diameter D (mm) of the parallel light after emergence from the lens 1-16 is expressed by:

$$D = 4\lambda f_{1-16}/(\pi\delta) \quad (1)$$

where λ is the wavelength (mm) of the light.

We next describe the laser light as it propagates through the optics that are shown in FIG. 4 as seen in the auxiliary scanning direction. In such optics, the principal rays of all beams are in substantial agreement with the optical axis at any stage of the travel from their emergence from the laser light source 1-1 until they reach the rotating polygonal mirror 1-19. As for the beam diameter of each beam, the discussion about the optics shown in FIG. 3 holds valid to the extent that the beams emerge from the lens 1-16 as parallel light having a beam diameter D (mm) of $4\lambda f_{1-16}/(\pi\delta)$. It should, however, be noted that the light emerging from the lens 1-16 is focused on the rotating polygonal mirror 1-19 by means of the cylindrical lens 1-18. If the diameter of the resulting spot is written as δ' (mm), it is expressed by:

$$\delta' = (f_{1-18}/f_{1-16})\delta \quad (2)$$

Figure 5:
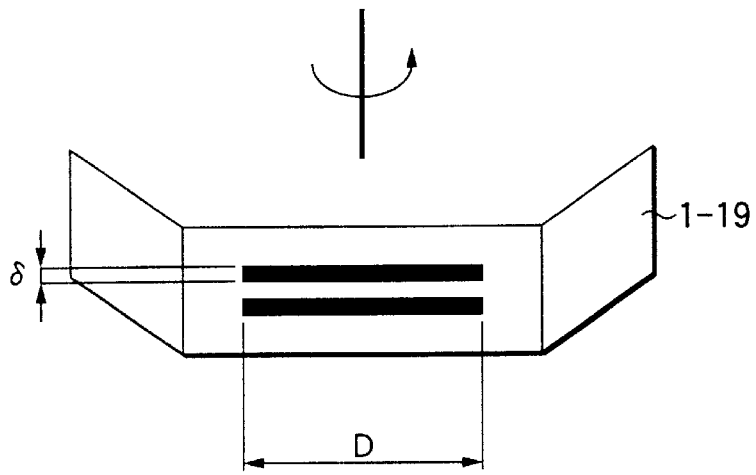
FIG. 5 shows in detail a part of the rotating polygonal mirror as an optic in the optical recording apparatus of the invention.

Hence, light spots each having a transverse width of D (mm) and a vertical width δ' (μm) as shown in FIG. 5 are formed on a reflecting face of the rotating polygonal mirror 1-19.

Figure 14:
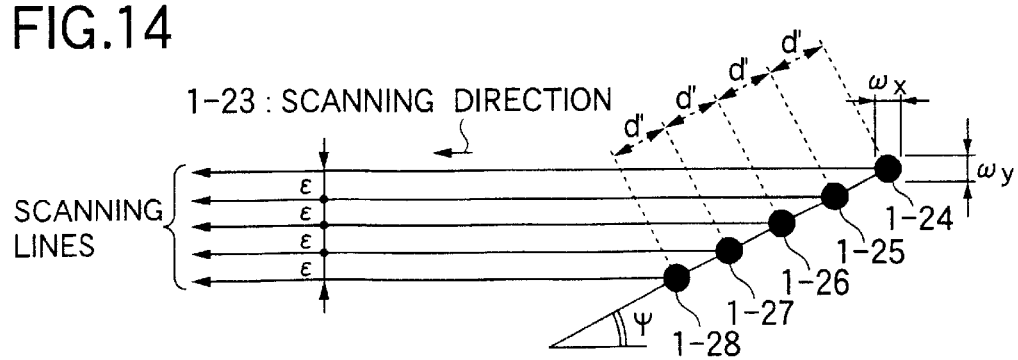
FIG. 14 illustrates the series of image spots formed on the photoreceptor drum in the optical recording apparatus of the invention.
Figure 15:
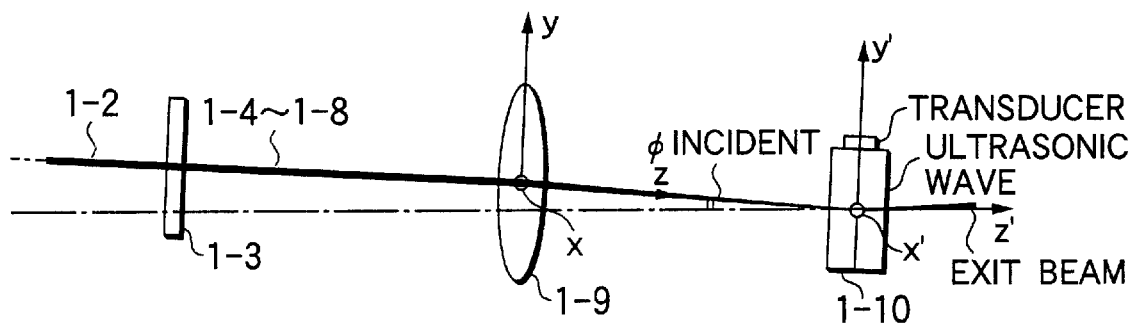
FIG. 15 shows the layout of the light-transmitting diffraction grating, the imaging lens and the multi-channel acousto-optic modulator in the optical recording apparatus of the invention.
Figure 16:
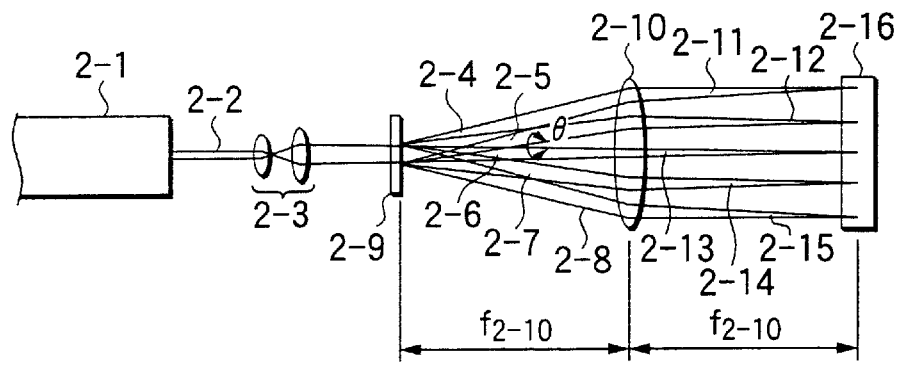
FIG. 16 is a schematic view of the conventional art.

The light reflected from the rotating polygonal mirror 1-19 passes through the scanning lens system 1-20 to be imaged on the photoreceptor drum 1-21. If the focal length of the scanning lens system 1-21 is written as $f_{F\Theta}$ (mm), the image spot diameters ωx and ωy on the photoreceptor drum 1-21, the distance d' between image spots, and the angle of inclination Ψ of an image spot (see FIG. 14) are expressed by the following equations:

$$\omega x = (f_{F\Theta}/f_{1-16})\delta \quad (3)$$

$$\omega y = m\delta' = m(f_{1-18}/f_{1-16})\delta \quad (4)$$

$$d' \approx (f_{F\Theta}/f_{1-16})d \quad (5)$$

$$\Psi = \sin^{-1}(\epsilon/d') \quad (6)$$

where ωx is the image spot diameter in the main scanning direction, ωy is the image spot diameter in the auxiliary scanning direction, and ε is the distance between adjacent scanning lines on the photoreceptor drum.

Consider here a multi-beam optical recording apparatus having a print density of 600 dpi (dots per inch) and substitute specific values into the above-described variables of the optics. Assume that the beams focused on the multi-channel acousto-optic modulator 1-10 have a spot diameter of δ=50 μm, adjacent beams are spaced by a distance of d=1.5 mm, the imaging lens 1-9 has a focal of $f_{1-9}$=100 mm, the lens 1-16 has a focal length of $f_{1-16}$=200 mm, the cylindrical lens 1-18 has a focal length of $f_{1-18}$=100 mm, and the scanning lens system 1-10 has a focal length of $f_{F\Theta}$=200 mm and a magnification of m=2. Then, the image spot diameters on the photoreceptor drum 1-21 are ωx=50 μm and ωy=50 μm, with d'=1.5 mm. Since the distance between adjacent scanning lines on the photoreceptor drum 1-21 is 1/600 inches=42.3 μm, Ψ is calculated to be 1.617 (deg).

Having described the construction of the optical recording apparatus, we next describe in detail the light-transmitting diffraction grating 1-3, imaging lens 1-9 and multi-channel acousto-optic modulator 1-10 which are the components that split and modulate laser light.

While a plurality of diffracted beams are obtained by splitting with the light-transmitting diffraction grating 1-3, it is assumed to use five beams including beam 1-8 of the diffraction order −2 to beam 1-4 of the diffraction order +2 as shown in FIG. 1. Also assume a coordinate system (xyz) for the imaging lens 1-9 in the principal plane on the entrance side, with the angles of rotation on the respective axes being (αβγ), as well as a coordinate system (x'y'z') for the multi-channel acousto-optic modulator 1-10 in the position of its placement, with the angles of rotation on the respective axes being (α'β'γ'), as shown in FIG. 1. The angles of rotation are positive for clockwise rotation from the respective axes.

As already mentioned, in the optical system composed of the light-transmitting diffraction grating 1-3, imaging lens 1-9 and multi-channel acousto-optic modulator 1-10, the angle formed between the plane formed by the plurality of diffracted beams emerging from the imaging lens 1-9 and the surface of revolution of the rotating polygonal mirror (which is indicated by $\phi_{incident}$ in FIG. 1) is so set that the beams modulated with the multi-channel acousto-optic modulator 1-10 to emerge therefrom will be launched into the surface of revolution of the rotating polygonal mirror.

A possible layout for realizing optics that enable angle incidence on the multi-channel acousto-optic modulator 1-10 is by positioning the light-transmitting diffraction grating 1-3 and the imaging lens 1-9 in such a way that their entrance faces are normal to the optical axis of the laser light 1-2 issuing from the laser light source 1-1. However, for the case of using tellurium dioxide (TeO$_2$) (this is often used as the acousto-optic crystal medium of the multi-channel acousto-optic modulator 1-10) and a carrier frequency of 200 (MHz), the angle of incidence $\phi_{incident}$ on the multi-channel acousto-optic modulator 1-10 is as small as 1–2 (deg). Hence, it is difficult to set the positions and angles of placement of the light-transmitting diffraction grating 1-3 and the imaging lens 1-9 with high mechanical precision, thus making it difficult to achieve normal incidence of laser light 1-2 with its optical axis being in exact registry with the center of the imaging lens 1-9.

Figure 6:
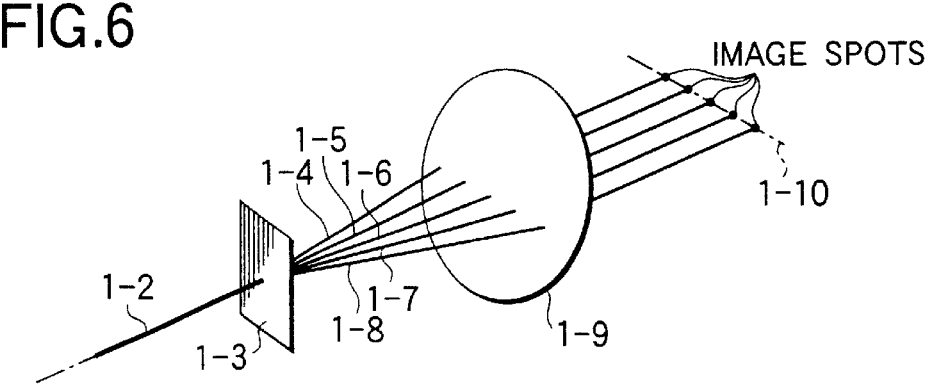
FIG. 6 is a partial enlarged view of the optics in the optical recording apparatus of the invention.

Let us therefore consider how the beams incident on the imaging lens 1-9 will affect the angular departure and the positional displacement as these are related to the layout of the optics under consideration. As shown in FIG. 6, if the diffracted light obtained by splitting with the light-transmitting diffraction grating 1-3 and which is incident on the imaging lens 1-9 has neither incident angle α (since the diffracted light consists of more than one beam, the incident angle is defined for the beam of zeroth-order diffraction which is not diffracted but is simply transmitted through the diffraction grating) nor error in incident height H (for convenience sake, this error in incident high is also defined by the amount of positional offset between the beam of zeroth-order diffraction and the center of the imaging lens), the image spots condensed in the position where the multi-channel acousto-optic modulator 1-10 is placed are arranged on a straight line at equal spacings.

Figure 7:
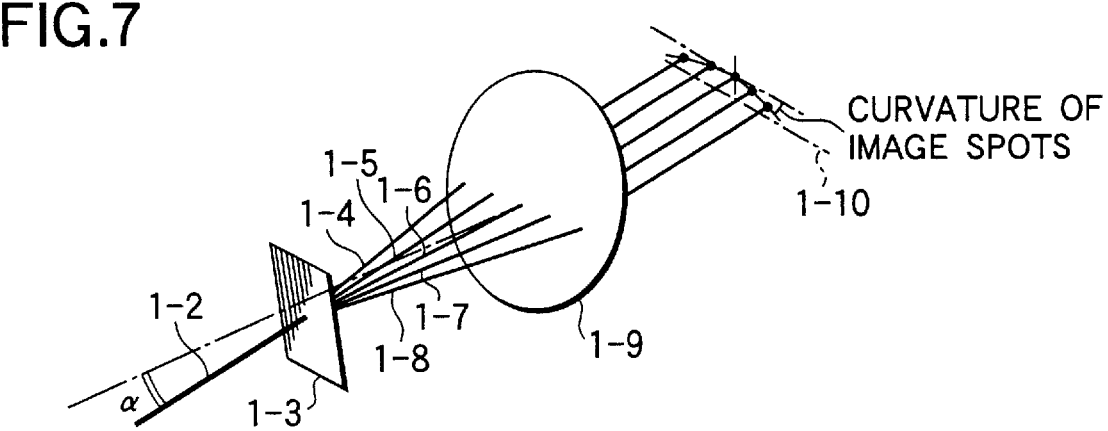
FIG. 7 is a partial enlarged view of the optics in the optical recording apparatus of the invention.
Figure 8:
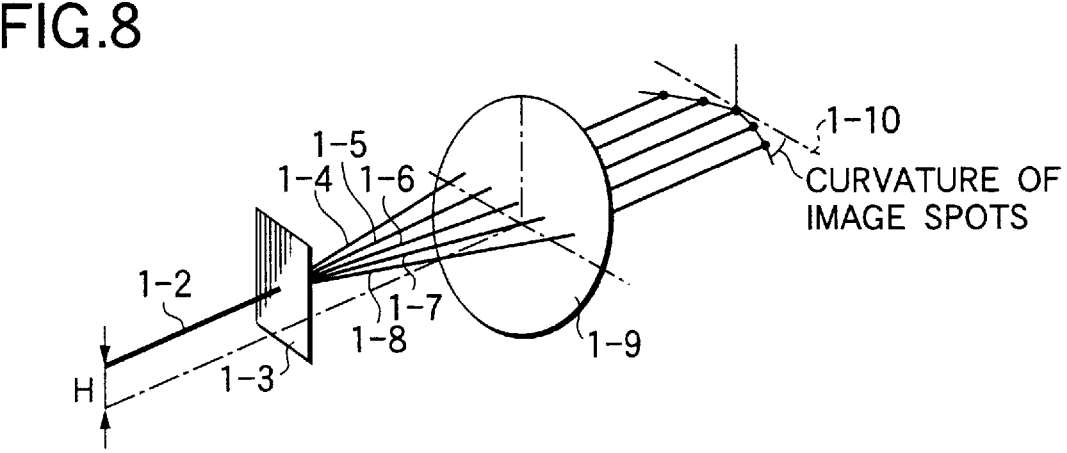
FIG. 8 is a partial enlarged view of the optics in the optical recording apparatus of the invention.
Figure 9:
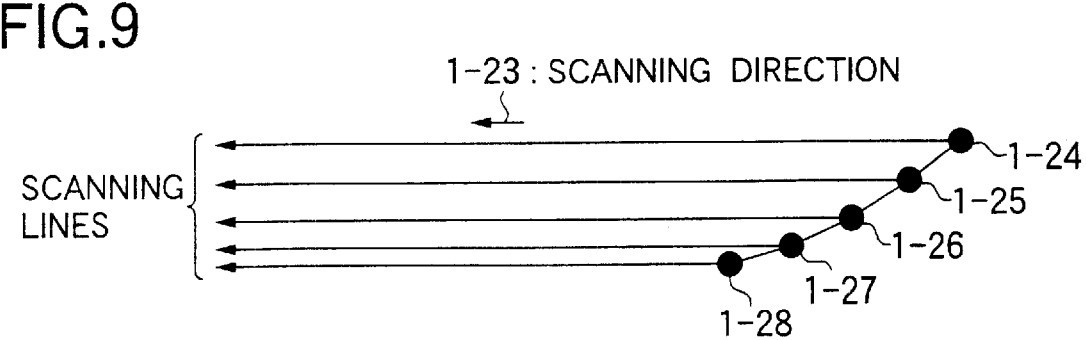
FIG. 9 illustrates how the curvature of image spots affect scanning on the surface of interest by the optical recording apparatus of the invention.

However, if as shown in FIGS. 7 and 8, the incident beams have the incident angle α (FIG. 7 shows the case where α<0 and H=0) or the error in incident height H (FIG. 8 shows the case where α=0 and H>0), the image spots condensed in the position where the multi-channel acousto-optic modulator 1-10 is placed describe a curved line that is convex in the positive direction on the y' axis. As already mentioned, the series of image spots condensed in the position where the multi-channel acousto-optic modulator 1-10 is placed are imaged on the photoreceptor drum 1-21 by means of the subsequent optics in the optical recording apparatus, so if the series of image spots formed in the area under consideration are already curved, scanning of the light spots imaged on the photoreceptor drum 1-21 causes an error to be introduced in the distance between scanning lines, which leads to deterioration in the image formed by optical recording (see FIG. 9).

Figure 10:
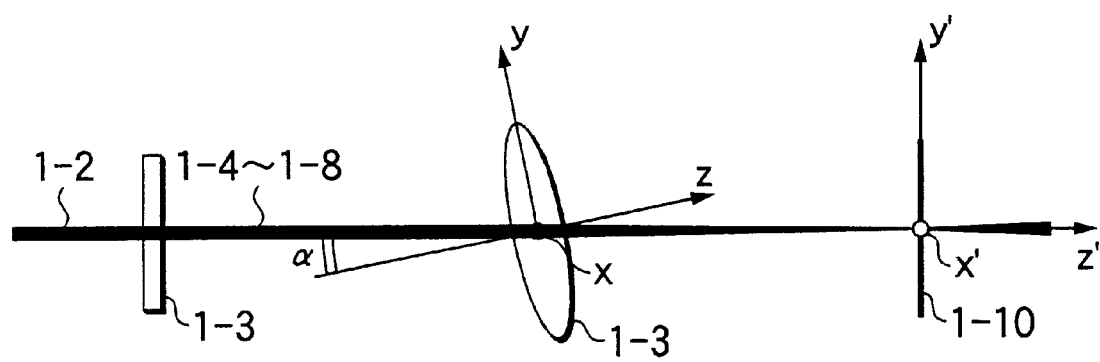
FIG. 10 is an illustration of the angle of incidence on the imaging lens.
Figure 11:
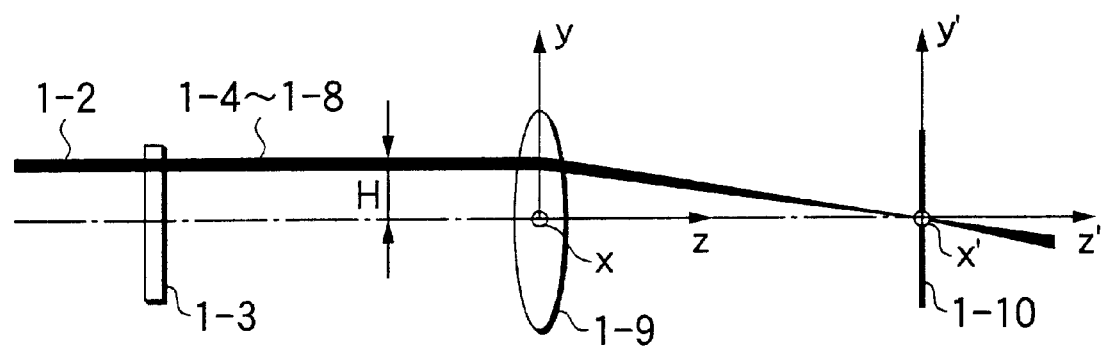
FIG. 11 is an illustration of the error in the height of incidence on the imaging lens.

FIGS. 17–19 and FIGS. 20–22 show the results of simulation by ray tracing program of the beam imaging positions of the zeroth- to third-order diffracted light for two cases, one being the case where the diffracted light incident on the imaging lens 1-9 had the incident angle α (rad) as shown in FIG. 10 (and tabulated in FIGS. 17–19) and the other being the case where the same diffracted light had the error in incident height H (mm) as shown in FIG. 11 (and tabulated in FIGS. 20–22), with the distance between spots on the multi-channel acousto-optic modulator 1-10 being set as d=1.5 mm and the focal length of the lens 1-9 being varied as $f_{1-9}$=60, 330 and 600 (mm).

FIGS. 17 and 20 show the results of calculating the coordinates of the positions where the zeroth- and first-order diffracted light were imaged, FIGS. 18 and 21 show the results for the zeroth- and second-order diffracted light, and FIGS. 19 and 22 for the zeroth- and third-order diffracted light. The imaging lens 1-9 used in the simulation was a biconvex lens. In FIGS. 17–22, the positions in which diffracted light of interest was imaged in the direction of the y axis as referenced to the imaging position of the zeroth-order diffracted light are given as the actual amounts of curvature. The results for the light of zeroth- to minus third-order diffraction are symmetrical with the y axis. As one can see, the series of image spots formed in the imaging position are curved to a greater extent as the diffracted light incident on the imaging lens 1-9 has an increasing incident angle and a greater error in incident height. It can also be seen that the curvature increases with the increasing diffraction order.

Even if the diffracted light incident on the imaging lens 1-9 has an incident angle and an error in incident height, the curvature of the series of image spots formed in the position of the multi-channel acousto-optic modulator could be reduced by modifying the imaging lens 1-9 to be a combination lens. However, this approach not only requires a complicated structure but also increases the manufacturing cost.

Alternatively, the above-described characteristics of the curvature of the image spots with respect to the incident angle and the error in incident height can be effectively used to cancel out the curvatures in the series of image spots. For example, the series of image spots that has been curved to describe a line concave in the positive direction on the y axis because the diffracted light incident on the imaging lens 1-9 had a positive incident angle (α>0) can be compensated for the curvature by correcting the error in the incident height of the same diffracted light toward the positive direction (H>0) on the y axis. In other words, optics that introduce no curvature in the series of image spots can be realized if they satisfy certain conditions of the combination of the incident angle and the error in incident height.

Therefore, in order to ensure that the amount of curvature that is introduced in the series of image spots formed on the multi-channel acousto-optic modulator 1-10 if the diffracted light incident on the imaging lens 1-9 has the incident angle α and the error in incident height H as shown in FIGS. 17–19 and FIGS. 20–22 can be determined irrespective of the diffraction order of the diffracted light and the focal length of the imaging lens 1-9, the present inventors set a normalized quantity $\mu$ (mm$^2$) for the incident angle α (rad), as well as a normalized quantity ν (mm$^3$) for the error in incident height H by the following equations:

$$\mu=(u \times f_{1-9})/m^2 \tag{7}$$

$$\nu=(v \times f_{1-9}^2)/m^2 \tag{8}$$

where u (mm) is the actual amount of curvature for the incident angle α (rad) and v (mm) is the actual amount of curvature for the error in incident height H (mm).

Figure 12:
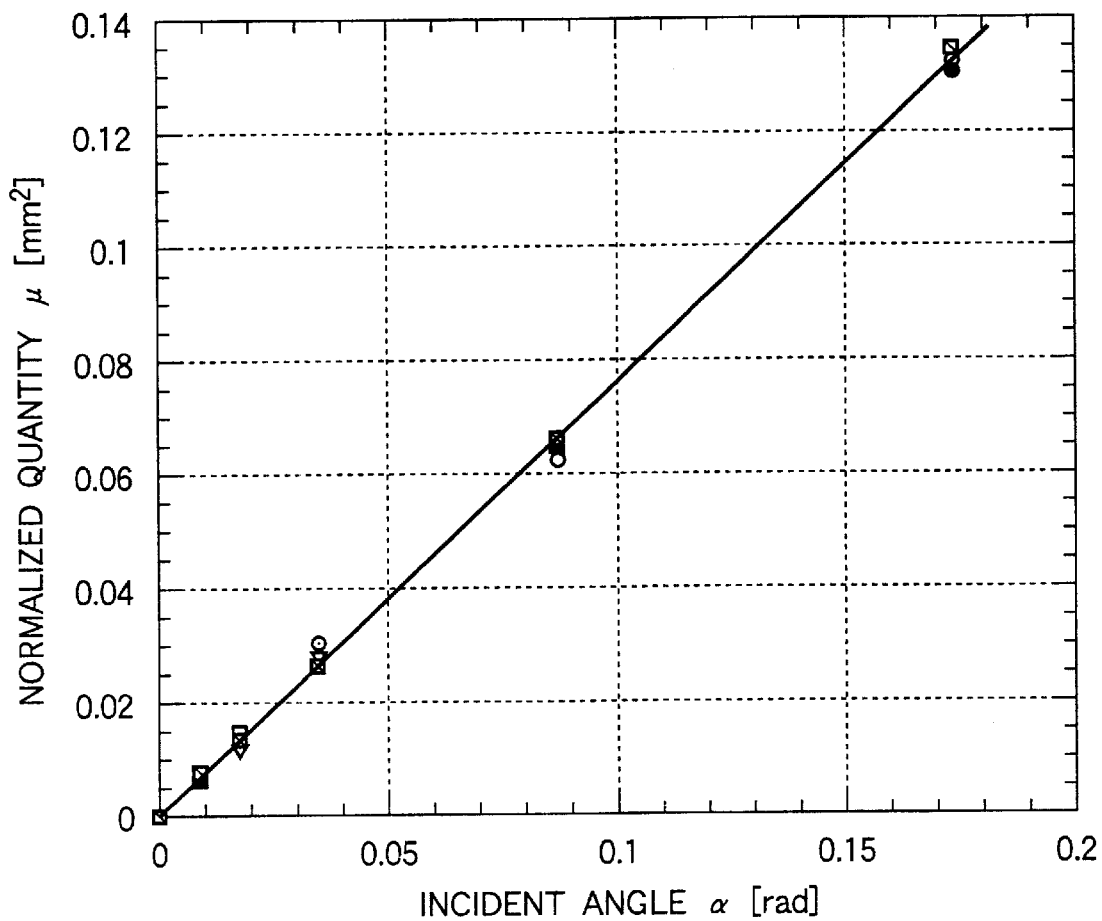
FIG. 12 illustrates the normalized quantity for the angle of incidence on the imaging lens.
Figure 13:
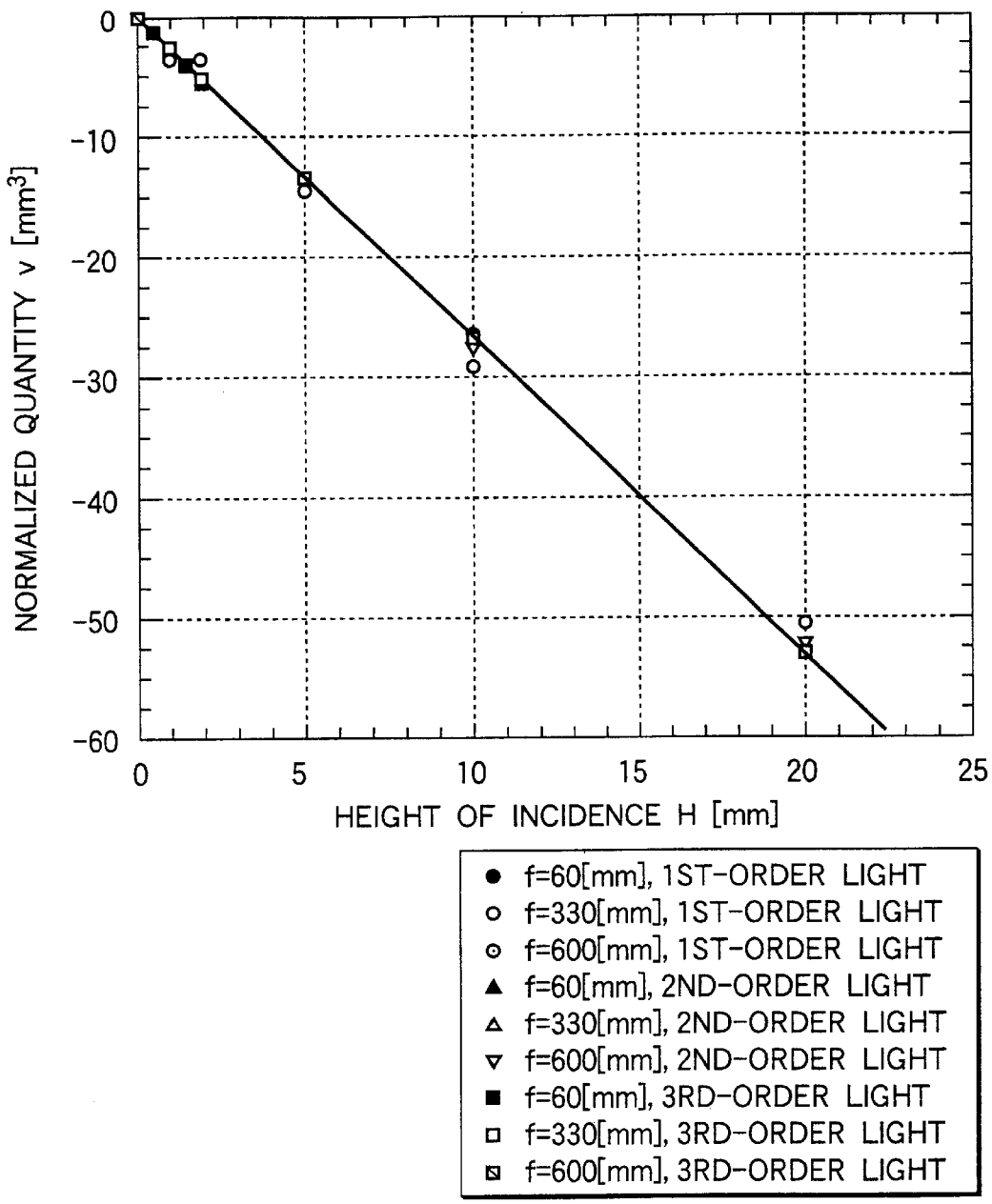
FIG. 13 illustrates the normalized quantity for the error in the height of incidence on the imaging lens.

FIG. 12 is a graph plotting the normalized quantity $\mu$ (mm$^2$) for the incident angle α (rad) and FIG. 13 is a graph plotting the normalized quantity ν (mm$^3$) for the error in incident height H (mm). From these graphs, one can see that α and $\mu$, as well as H and ν have linear relationships that are independent of the diffraction order and the focal length of the imaging lens 1-9 and which are expressed by the following equations:

$$\mu=c1 \times \alpha \approx 0.763 \times \alpha \ (c1 \text{ is a constant}) \tag{9}$$

$$\nu=c2 \times H \approx -2.640 \times H \ (c2 \text{ is a constant}) \tag{10}$$

From eqs. (7)–(10), the actual amounts of curvature u and v are expressed as:

$$u=(0.763 \times m^2 \times \alpha/f_{1-9}) \tag{11}$$

$$v=(-2.640 \times m^2 \times H/f_{1-9}^2) \tag{12}$$

Therefore, by setting the combination of α and H in such a way as to satisfy the following equation (13):

$$|u+v|=|(m^2/f_{1-9}) \times (0.763 \times \alpha - 2.640 \times H/f_{1-9})|=0 \tag{13}$$

the amounts of curvature in the series of image spots formed on the multi-channel acousto-optic modulator 1-10 can be cancelled out to become zero. In fact, however, the error in adjustment of the optical path and other factors prevent the amounts of curvature from being reduced to exactly zero. As a practical guide, they may be adjusted to become smaller than the image spot diameter δ (mm) on the multi-channel acousto-optic modulator 1-10, namely, to satisfy the following relation (14):

$$|(m^2/f_{1-9}) \times (0.763 \times \alpha - 2.640 \times H/f_{1-9})|<\delta \tag{14}$$

If this condition is met, one can at least prevent the overlap of adjacent scanning lines on the photoreceptor drum so that there will be no undesired deterioration of print quality.

As described on the foregoing pages, according to the present invention, the laser beams emerging from the imaging lens can be condensed as a non-curved series of spots on the multi-channel acousto-optic modulator. As a result, an optical recording apparatus can be realized that performs multi-beam scanning by allowing the series of condensed light spots on the multi-channel acousto-optic modulator to be imaged on the multi-channel acousto-optic is possible without causing errors in the distance between scanning lines and satisfactory optical recording can be maintained.

What is claimed is:

1. An optical recording apparatus comprising:

a light source for generating a laser light beam;

a light-transmitting diffraction grating for splitting the laser light beam into a plurality of diffracted light beams;

a multi-channel acousto-optic modulator for modulating the diffracted light beams being sent from the light-transmitting diffraction grating;

an imaging lens provided on the optical path between the light-transmitting diffraction grating and the multi-channel acousto-optic modulator; and a rotating polygonal mirror for scanning a surface to be scanned in a predetermined direction with the laser beams being sent from the multi-channel acousto-optic modulator;

wherein the light-transmitting diffraction grating is provided at the front focus of the imaging lens, the multi-channel acousto-optic modulator being provided at the back focus of the imaging lens, the angle formed between a plane formed by the diffracted beams emerging from the imaging lens and a revolution surface of the rotating polygonal mirror is set to be equal to an angle at which the beam diffracted by the multi-channel acousto-optic modulator emerges to be incident on the revolution surface of the rotating polygonal mirror, and the diffracted beams are allowed to be incident on the imaging lens to satisfy the condition set forth below:

$$|(m \times m/f) \times (0.763 \times \alpha - 2.640 \times H/f)| < \delta$$

where:

$\alpha$ is the angle (rad) at which the diffracted light of zeroth order from the light-transmitting diffraction grating is incident on the imaging lens;

H is the distance (mm) between the position in which the diffracted light of zeroth order from the light-transmitting diffraction grating is incident on the imaging lens and the center of the imaging lens;

m is the absolute value of the highest diffraction order used of the diffracted beams obtained by splitting with the light-transmitting diffraction grating;

f is the focal length (mm) of the imaging lens; and $\delta$ is the diameter (mm) of each of the diffracted beams on the multi-channel acousto-optic modulator.

2. The optical recording apparatus as claimed in claim 1, wherein multi-channel acousto-optic modulator comprises a plurality of channels disposed in parallel.

* * * * *